UNITED STATES PATENT OFFICE.

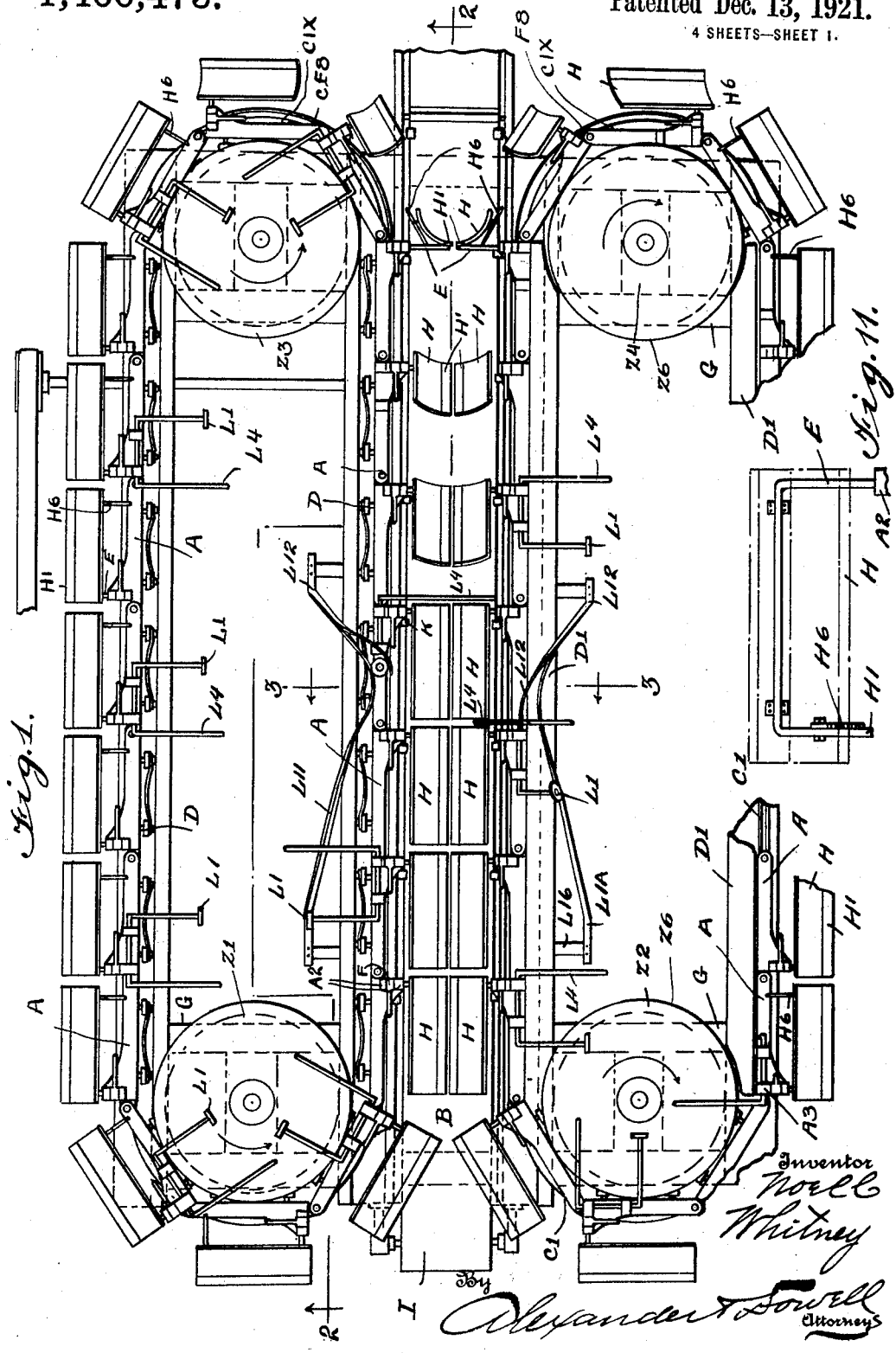

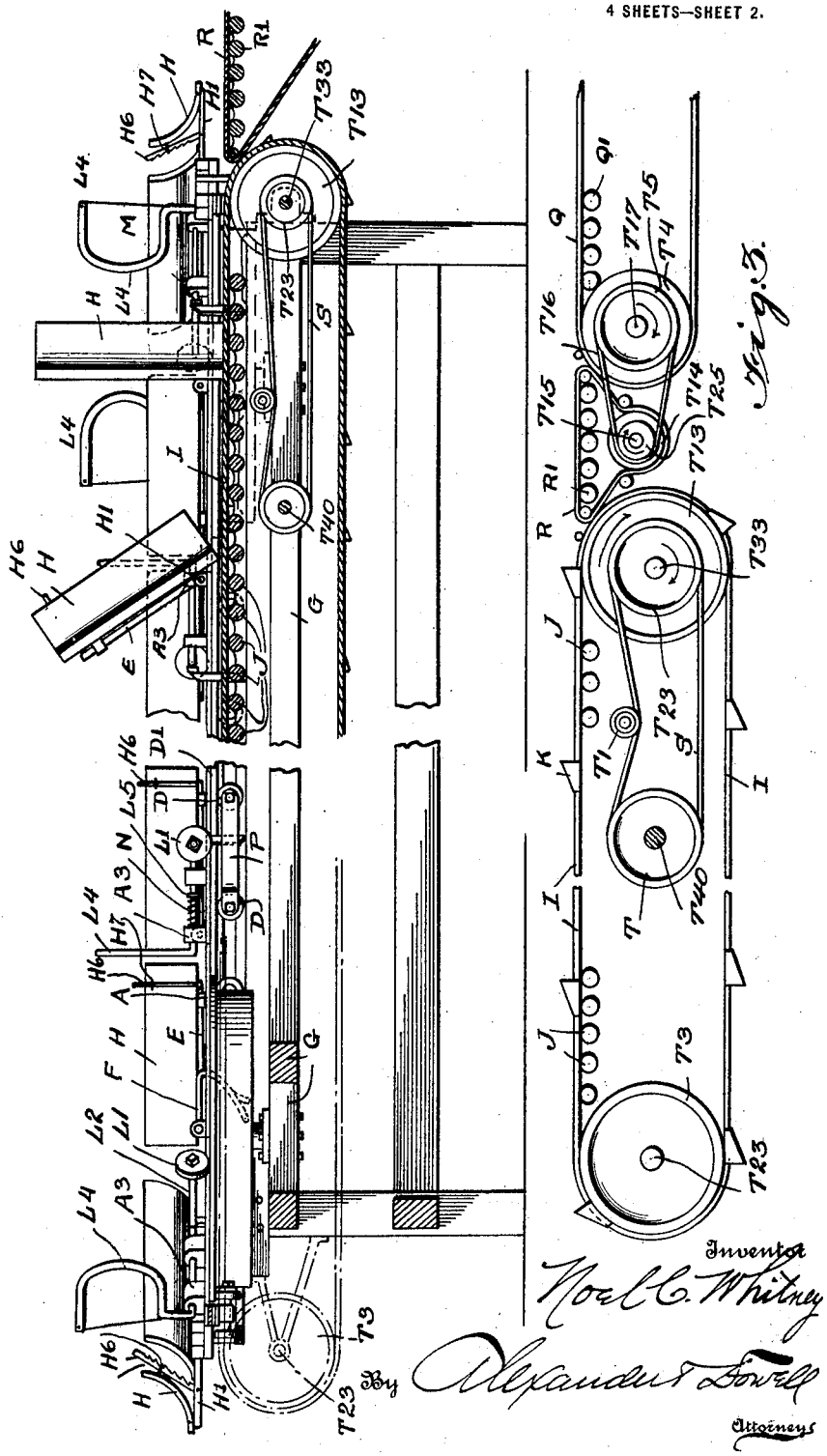

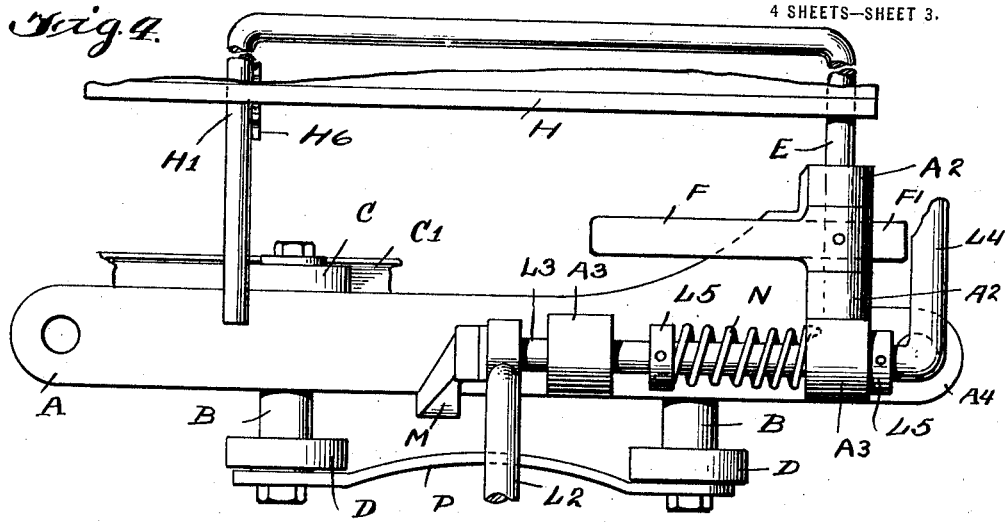
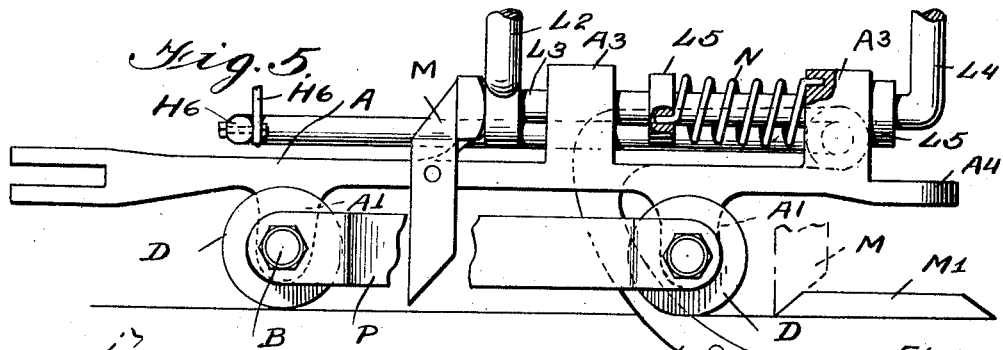
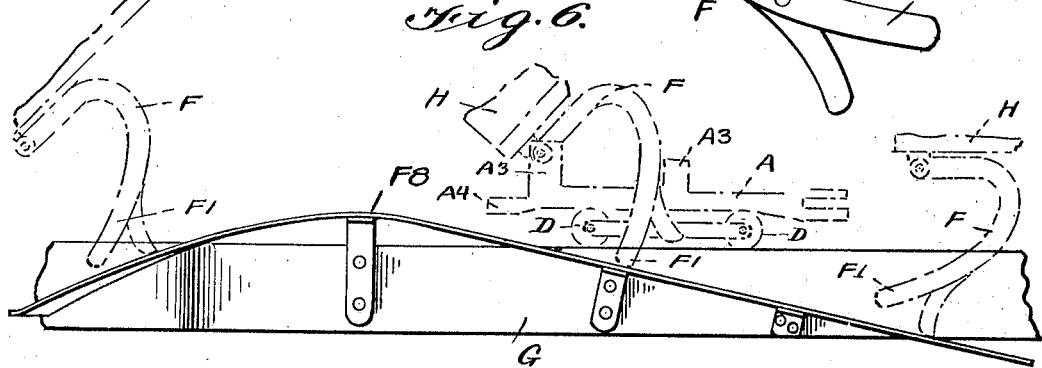

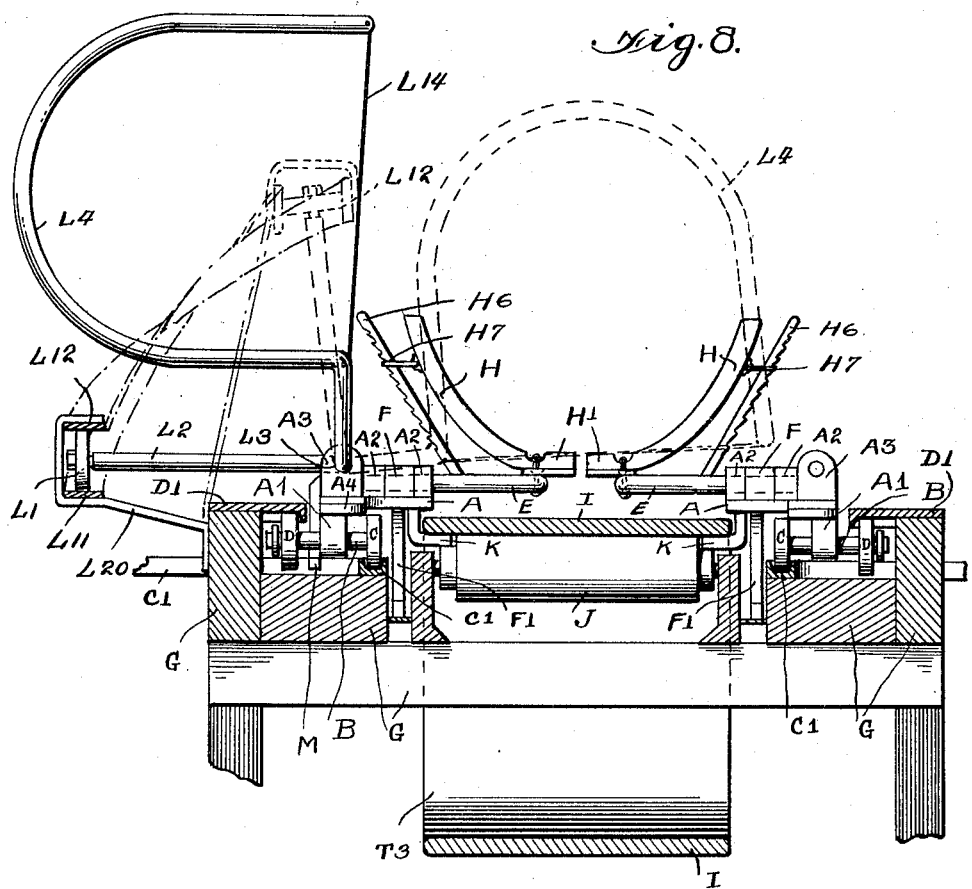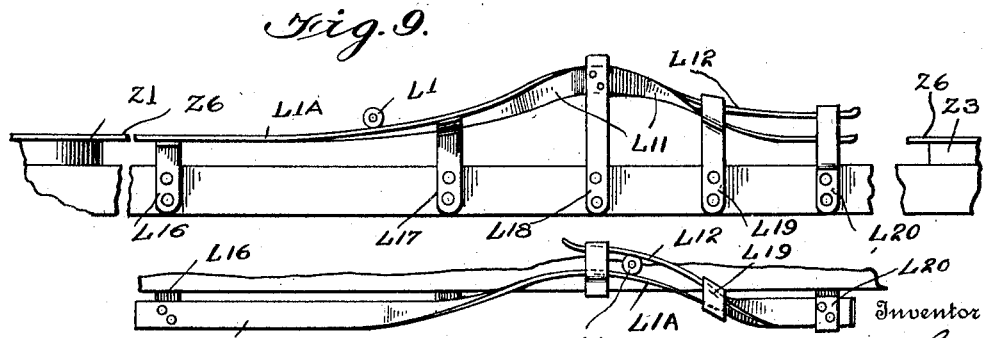

NOEL C. WHITNEY, OF TERRE HAUTE, INDIANA.

AUTOMATIC TILE-CUTTER.

1,400,473.  Specification of Letters Patent.  Patented Dec. 13, 1921.

Application filed May 4, 1921. Serial No. 466,771.

*To all whom it may concern:*

Be it known that I, NOEL C. WHITNEY, a citizen of the United States, residing at Terre Haute, in the county of Vigo and State of Indiana, have invented certain new and useful Improvements in Automatic Tile-Cutters; and I hereby declare that the following is a full, clear, and exact description thereof, reference being had to the accompanying drawings, which form part of this specification.

This invention is a novel improvement in mechanism for cutting drain tile and other plastic continuous products after the same have been ejected from the molding mechanism. The object of the invention is to provide a machine which can be used in connection with a machine for expressing tile or like plastic products in a continuous form and for cutting the tile into equal lengths after it is ejected from the machine and while it is being moved from said forming machine to point of discharge. Another object of the invention is to make a machine wherein the tile may be severed accurately and cleanly into desired lengths and up-ended and discharged onto a conveyer, the operations of cutting and discharging taking place during the continuous movement of the tile from the forming machine to the receiving conveyer.

The invention includes novel mechanism for supporting the plastic material during the cutting operation and then up-ending same and transferring it onto a delivery belt; also novel mechanism for cutting the tile while it is traveling; also other minor novel features of construction and operation and novel combinations of parts which will be hereinafter set forth.

In the accompanying drawings I have illustrated a machine particularly designed and adapted for cutting plastic pipe into desired tile lengths or sections as one embodiment of the invention; and I will explain the invention with reference to said machine to enable others to adapt and use the same, but I do not consider the invention restricted to the particular mechanism shown and described, and refer to the claims for summaries of the essentials of the invention and novel features of construction and novel combinations of parts for which protection is desired.

In said drawings:

Figure 1 is a top plan view of the machine illustrating the general construction and method of operation of the machine; a number of small parts being omitted for clearness of illustration.

Fig. 2 is a diagrammatical longitudinal section through the machine on the line 2—2, Fig. 1.

Fig. 3 is a diagrammatical illustration of the main transfer belt and conveyer belt and driving mechanism.

Fig. 4 is an enlarged top plan view partly in section and partly broken away of one of the trough section carrier links and parts connected therewith.

Fig. 5 is a side view of Fig. 4.

Fig. 6 is a detail diagrammatical view illustrating the cam for tilting the hinged sections and the successive positions of such sections following a cutting operation.

Fig. 7 is a detail side view of one of the levers F.

Fig. 8 is an enlarged transverse section on the line 3—3, Fig. 1.

Fig. 9 is a detail side view of the cams for operating the cutters.

Fig. 10 is a top plan view of Fig. 9.

Fig 11 is a detail view of one of the trough sections.

The machine illustrated in the drawings comprises two endless carrier chains operating side by side in a horizontal plane, the inner ends of these carriers being adjacent but spaced apart. These carriers are formed of a series of links A as hereinafter explained which are pivotally connected together like a chain and are guided around the front and rear guide wheels $Z^1$ and $Z^3$ and front and rear guide wheels $Z^2$ and $Z^4$ as indicated in Fig. 1.

The guide wheels $Z^1$, $Z^2$, $Z^3$, $Z^4$, have peripheral flanges $Z^6$ on their upper ends (see Fig. 9) which flanges serve as continuations of the overhead guide $D^1$ for the rollers $D$, as the links pass around the guide wheels. These guide wheels are journaled on vertical stub shafts suitably secured in the supporting framework of the machine, which framework may be of any suitable desired construction. As shown each carrier is made up of twenty links A making 20 right and 20 left. As shown in Fig. 5 each link has two depending lugs $A^1$, which are attached to axles B carrying on their inner ends wheels C and on their outer ends rollers D. The wheels C engage guide tracks suitably mounted on the frame, the straight way portion of which tracks are preferably formed of channel iron $C^1$ while the outer ends of the track which are concentric with the carrier pulleys or wheels may be flat as shown at $C^{1x}$. The wheels C support the links A and the rollers D are passed under overhead guide plates $D^1$ which counteract the weight of the parts of the tile supporting members attached to the plates as hereinafter described, the guide $D^1$ being suitably supported on the frame so as to connect the upper sides of the wheels D, (see Fig. 8). Mounted on the outer ends of the axle B and to confine the rollers D thereto are curved strips P which are adapted to engage and fit against the face of the sheave wheels or pulleys $Z^1$, $Z^3$, $Z^2$, $Z^4$, as the carrier links pass around the wheels and thus keep the links properly spaced as they pass around the said wheels. Each link is provided on its upper face with boxes or studs $A^2$ in which is journaled one end of a U-shaped rod E, (Figs. 4, 5, and 8) and to the body of this rod is rigidly attached the bottom member $H^1$ of one of the trough sections, and to this bottom member is hingedly attached the side member H of such trough section; the side member may be adjusted relatively to the bottom member of the trough section by any suitable means. As shown a notched bracing lever $H^6$ (Figs. 2 and 8) is pivoted to the other arm of the rod E and its upper end rests against the outer side of the trough member H and may be held in adjusted position against this trough member by means of a bale $H^7$ pivoted to the member H and engaging a notch in the bracing lever. In this way the body member H of the trough section can be held in any desired position.

The trough sections are right and left and it takes two such sections to support a tile but each of the sections are constructed and operated alike on both the right and left hand carriers but at the inner runs of the carrier the right hand section on the cross section of one carrier coacts with the left hand section on the cross section of the other carrier and together make a complete support and holder for the tile as hereinafter explained. The trough sections normally lie in horizontal position but they are operated at the proper times and manner by suitable means.

As shown a lever F is pinned to the shaft E between the lugs $A^2$ and this lever is bent as shown in Figs. 5 and 7 and its angular portion depends beside the link adjacent the wheels C and beside the guide track $C^1$. One end $F^1$ of this lever is adapted to engage a cam $F^8$ attached to the frame at a point beyond where the cutting of the tile is completed so as to rock shaft $E^1$ and turn the trough sections upward until the completed tile is up-ended as hereinafter described. Then the lever F passes the cam $F^8$ and the trough sections return to normally horizontal position as they pass around the forward sheaves.

The positions of the trough sections as they traverse cam $F^8$ are indicated in Fig. 6.

Each link A carries a tile cutter which is preferably composed of a bow $L^4$ provided with a cutting wire $L^{14}$. The bow $L^4$ is attached to or formed integral with a shaft or rod $L^3$ which is journaled in studs $A^3$ on the upper side of each link A (see Figs. 4, 5, 8) with the shaft $L^3$ lying at right angles to the bow $L^4$ and on the inner end of this shaft is attached a lever $L^2$ which lies at right angles to the shaft and preferably carries on its outer end the roller $L^1$, (Fig. 8) which is adapted to engage the cams that operate the bow at the proper time. The bow $L^4$ normally stands in a vertical position at right angles to the trough sections H, but by properly rocking the shaft $L^3$ it can be turned down at right angles to the trough sections so that if a plastic pipe or object was lying on the trough section it would cut same.

The bow is normally held in raised position by means of a spring N which is interposed between a collar $L^5$ on shaft 3 and the forward lug $A^3$ on the link and one end of the spring is connected to the collar and the other end to the link and the spring being wound so that it will tend to normally turn the shaft $L^3$ and hold the bow raised and the lever $L^2$ in lowered position, as shown in Fig. 8.

The spring N normally tends to slide the shaft $L^3$ longitudinally of the lugs $A^3$ but such movement of the shaft by the spring is limited by means of a collar $L^5$ on the shaft $L^3$. This shaft $L^3$ is moved longitudinally at the proper time so as to compress the spring N by means of a cam lever M, which is pivoted on the side of the link A and has its upper end adapted to engage the end of the shaft $L^3$. (See Figs. 4 and 5). The lower end of the lever M at the proper time engages with a cam $M^1$ as hereinafter explained. The spring N serves to return the shaft and bow to normal position when permitted by the cams.

At the proper time the roller $L^1$ on the end of lever $L^2$ engages a cam plate $L^{11}$. (See Figs. 1, 8, 9 and 10.) This cam plate extends beside the inner runs of each half section of the carrier beginning at a point slightly in advance of where the cutter should begin its operation and continuing to a point slightly beyond that at which the bow has completed its operation and has completely retracted, and between these points the roller $L^1$ is so shifted that as the link carrying the bow traverses lengthwise of this cam plate the cutter is lowered farther and farther so as to cause the wire $L^{14}$ to accurately sever the pipe line on the trough sections into tile lengths and then the bow is retracted by means of a secondary cam plate $L^{12}$ which is arranged above and conforms to the curvature of the primary or forward cam plate $L^{11}$. These cam plates may be supported by suitable brackets $L^{16}$, $L^{17}$, $L^{18}$, $L^{19}$ and $L^{20}$ as indicated in Figs. 9 and 10.

Extending lengthwise of the machine and between the adjacent inner runs of the carriers is an endless belt I which passes over wheels $T^3$ and $T^{13}$ mounted respectively on shafts $T^{23}$ and $T^{33}$ suitably attached to the frame (see Fig. 3). The upper run of the belt I may be supported by pulleys or rollers J which are suitably mounted in side frames of the machine so as not to interfere with the levers F. Attached to the belt I at proper intervals along its length are lugs K which are adapted to engage with the forward ends of the links A on each carrier, when on the inner runs of the carrier, and cause the carriers to move with the belt I. The forward motion of the belt I causes the carriers to move around the sheave wheels. In the example shown there would be 7 carrier links A simultaneously in contact with lugs K on each side of the belt. This arrangement insures that the carriers will move accurately and the speed be controlled by the speed of the belt I for a purpose hereinafter explained.

The carrier I is adapted to be driven by any suitable means. Preferably on the shaft $T^{33}$ is a pulley $T^{23}$ driven by a belt S from a pulley T on a drive shaft $T^{40}$ which latter may be driven by any suitable means and the tension of this belt S is regulatable by a tension roller $T^1$ which may be of any suitable construction and adjusted in any well known manner so as to regulate the tension of the belt. From belt I the tile could be passed over a belt R to a belt Q. The belt R may have supporting rollers $R^1$ arranged beneath its upper run and the belt Q could have supporting rollers $Q^1$ arranged beneath its upper run. The belt R is driven in the proper direction and may be passed over pulley $T^{14}$ on a shaft $T^{15}$ which shaft carries a pulley $T^{25}$ driven by a belt $T^{16}$ from a pulley $T^5$ on the shaft $T^{17}$ carrying the pulley $T^4$, over which the receiving end of the carrier Q runs. This transfer belt R and carrier belt Q may be of any suitable construction and are only diagrammatically illustrated in the drawings.

In the machine shown there are 20 links each carrying a half trough section as described and the trough sections on the right and left carriers coincide at the adjacent runs of the carriers and travel in the direction of the belt I and the adjacent right half sections and left half sections on the respective carriers make a complete trough section and in the machine shown there would be 7 such trough sections traveling down the center of the machine with and over belt I.

Operation.

The machine for forming or molding the pipe is not shown but may be of any well known kind and should be located at the receiving end of the belt I which is the left hand side of the machine shown in Fig. 1 so that the pipe or other object exuding continuously from the forming machine would be received upon and supported by the trough sections, the parts thereof enter between the wheels $Z^1$, $Z^2$, the point at which the uncut pipe or material is delivered onto the cutting machine being indicated at the point B in Fig. 1.

A continuous length of uncut tile is fed from the forming machine to the cutting machine at the point marked B, Fig. 1 and is received by the trough sections and carried therein down the center of the machine. For reasons which will be explained later, uncut tile travels in the trough the length of four sections before the cutting is completed.

After the cutting wire has completed its downward motion, through the column, the trough section immediately ahead of the cut, tilts upward, hinging from the front and while the cutting bow and wire returns to normal the trough section keeps tilting upwardly until it is in a vertical position and the tile it has carried is stood on end upon the conveyer belt I, which runs the full length of the machine directly underneath the trough. When the tile is placed on end as described, the trough sections separate, the right half section returning around sheave wheel $Z^4$ and the left half section returning around sheave wheel $Z^3$. The tile however travels straight forward on the conveyer belt I standing on end.

There are twenty cutting bows on the machine shown—ten on each carrier, so arranged that they operate in a staggered fashion while moving down the center of the machine, that is one tile is cut from the right, the next from the left, and so on in alternation. The cutter bows are arranged in this fashion in order to distribute the weight more equally so that there will be an even pull on each side of the drive-conveyer belt. Whether the cut happens to be from a left bow or a right, the point where the cut is completed is exactly the same.

In traveling down the center of the machine the cam roller $L^1$ on each cutting lever $L^2$ comes in contact with the cam $L^{11}$ and rises upward and inward with the lever $L^2$, causing the bow $L^4$ to move downward over the column of pipe and the wire $L^{14}$ severs a tile or section from the column, completing the cut at a designated point slightly beyond the center of the machine. Thereafter as the sections travel the tilting levers F F right and left come into contact with their cams F⁸ and the trough section, ahead of the cut just made, is tilted upwardly from the rear (as it is hinged at the front). As shown as the end of the preceding tile is clear of the bow lever M strikes cam M¹ (which is suitably located and fastened to the frame of the machine) and forces the shaft L³ forward, which enables the wire of the cutting bow to clear the tile as it rises to normal position. As the wire clears the top of the tile the cam M¹ releases the rocker arm M and the spring N thrusts the shaft and bow back to their original position.

The trough sections continue to tilt, due to the action of the levers F F and related cams F⁸ F⁸ (right and left) until they are standing in a vertical position with the tile it has carried placed on end on the belt I. The tilting cams F⁸ then permit the two opposite half trough sections to lower as they part and pass around the opposite sheave wheels Z³, Z⁴ and by the time the half sections have completed the turn around their sheave wheels, to the outboard sides on the machine, they have returned to their normal horizontal position and are ready to again receive and support the uncut tile column as they meet after turning around sheave wheels Z¹ and Z² at the center of the machine and above belt I.

As stated before the tile travels the length of four trough sections before it is severed. The traction between the tile column and the four above mentioned trough sections, tends to govern the speed of the cutting table and hold it to the same speed that the column of clay flows from the forming machine across the table. This is made possible by properly adjusting the tensioning roller T¹ on belt S which drives the machine.

The traction of the clay column on the trough sections holds the belt I to proper speed, the idler belt S slipping on the pulleys should the speed of the tile column be slower than that at which the pulley T would otherwise drive the belt I. Thus the greater part of the dead weight of the operating parts of the machine is driven by a source of power separate from the tile column, which tile column does just enough work to govern the speed of the machine. The drive conveyer belt I only extends a foot or two beyond the delivering end of the machine, and there the cut tile are transferred automatically to conveyer belt Q as described. This keeps the load constant on the belt I, while the load on belt Q fluctuates due to its being unloaded at different points at different times but this fluctuation of load does not interfere with the operation or adjustment of the tile cutting portions of the machine.

While I have described the invention as embodied in a machine for cutting tile, it is obvious that the machine can be readily adapted for cutting other forms of plastic material into desired lengths, and I consider all such adaptations of the invention within the scope of the invention and claims. Further I do not consider the invention restricted to the specific construction of the carrier, or of the cutting mechanism or of the trough sections and the operating devices shown in the drawings as various modifications and changes may be made in these elemental features while retaining the essentials of the invention; and all such changes and modifications within the scope of the invention are intended to be covered in the broader claims wherein features of construction are not specifically designated.

What I claim is:

1. In a machine for the purpose specified, the combination of a pair of endless carriers, arranged side by side with their inner runs parallel; a series of supporting members mounted on said carriers, the said members when on the adjacent runs of the carrier supporting the material being operated upon; and a series of cutting devices mounted on the carriers and adapted to operate upon the material supported by the said members during the travel thereof, substantially as described.

2. In a machine as set forth in claim 1, guide wheels for the carriers adjacent each end of the machine, and guides upholding the said members and cutting devices as they travel along the center of the machine.

3. In mechanism as set forth in claim 1, cams adjacent the inner runs of the carriers, and means connected with the cutters and engaging the carriers whereby the cutters are caused to operate upon the material and sever the same as it is moved along the center of the machine.

4. In a machine as set forth in claim 1, cams beside the inner runs of the carrier, and devices connected with the supporting members and engaging the cams whereby the severed sections of the material are upended, substantially as described.

5. In a machine as set forth in claim 1, an endless belt underlying the inner runs of the carriers, and means on said belt adapted to engage the carriers and cause the belt and carriers to travel at uniform speed.

6. In mechanism as set forth in claim 1; cams adjacent the inner runs of the carrier; means connected with the cutters and engaging the cams whereby the cutters are caused to operate upon the material and sever the same as it is moved along the center of the machine; other cams adjacent the runs of the carriers, and devices connected with the supporting members and engaging the latter cams whereby the severed sections of the material are up-ended.

7. In mechanism as set forth in claim 1, a rod hingedly mounted on the carrier, a supporting member mounted on said rod and means whereby said rod is turned at the proper time during the travel of the carrier to cause said member to discharge the material lying thereon.

8. In mechanism as set forth in claim 1, a rod rotatably mounted on the carrier, a cutter connected with said rod, a lever connected with the said rod, and a cam fixed beside the carrier engaging said rod and causing the cutter to operate as it travels with the carrier.

9. In mechanism as set forth in claim 1, a rod rotatably mounted on the carrier, a cutter connected with said rod, a lever connected with the end of said rod, a cam fixed beside the carrier engaging said rod to cause the cutter to operate as it travels with the carrier, a spring for normally retracting the cutter and for holding the rod in one position, and means for shifting said cutter carrying rod endwise after the cutting operation to cause the cutter to clear the severed material.

10. In a machine for the purpose specified, the combination of a pair of endless carriers, arranged side by side, the inner runs of said carriers being parallel and in the same plane but spaced apart; a series of trough sections mounted on each carrier; trough sections on the adjacent runs of the carrier adapted to carry the tile or material being operated upon; and a series of cutters mounted on each carrier and adapted to operate upon the material supported by the trough sections during the travel thereof along the center line of the machine.

11. In a machine as set forth in claim 10, guide wheels for the carriers adjacent each end of the machine; and guides upholding the said trough sections and cutting devices as they travel along the center of the machine.

12. In mechanism as set forth in claim 10, cams adjacent the inner runs of the carriers, and means connected with the cutters and engaging the carriers whereby the cutters are caused to operate upon the material and sever the same as it is moved along the center of the machine.

13. In a machine as set forth in claim 10, cams beside the inner runs of the carrier, and devices connected with the trough sections and engaging the cams whereby the severed sections of the material are up-ended, substantially as described.

14. In a machine as set forth in claim 10, an endless belt underlying the inner runs of the carriers, and means on said belt adapted to engage the carriers and cause the belt and carriers to travel at uniform speed.

15. In mechanism as set forth in claim 10; cams adjacent the inner runs of the carrier; means connected with the cutters and engaging the cams whereby the cutters are caused to operate upon the material and sever the same as it is moved along the center of the machine; other cams adjacent the inner runs of the carriers, and devices connected with the trough sections and engaging the latter cams whereby the severed sections of the material are up-ended.

16. In mechanism as set forth in claim 10; a rod hingedly mounted in the carrier, a trough section mounted on said rod and means whereby said rod is turned at the proper time during the travel of the carrier to cause said trough section to discharge the material lying thereon.

17. In mechanism as set forth in claim 10, a rod rotatably mounted on the carrier, a cutter connected with said rod, a lever connected with the said rod, and a cam fixed beside the carrier engaging said rod and causing the cutter to operate as it travels with the carrier.

18. In mechanism as set forth in claim 10, rods rotatably mounted on the carriers, a cutter connected with each rod, a lever connected with the end of said rod, a cam fixed beside the carrier engaging said rod to cause the cutter to operate as it travels with the carrier, a spring for normally retracting the cutter and for holding the rod in one position, and means for shifting the cutter carrying the rod endwise after the cutting operation to cause the cutter to clear the severed material.

19. In a machine for the purpose specified, the combination of a pair of endless carriers, arranged side by side, the inner runs of said carriers being parallel in the same plane but spaced apart; a series of trough sections mounted on each carrier, sections on the adjacent runs of the carrier carrying the tile or material being operated upon; cams beside the inner runs of the carriers; and devices connected with the trough sections and engaging the cams whereby the trough sections are tilted, substantially as described.

20. In a machine as set forth in claim 19; guide wheels for the carriers adjacent each end of the machine, and guides upholding the said trough sections and cutting devices as they travel along the center of the machine.

21. In mechanism as set forth in claim 19; cutters adjacent the inner runs of the carriers, and means whereby the cutters are caused to operate upon the material, while carried by the trough sections and sever the same.

22. In a machine as set forth in claim 19;

an endless belt underlying the inner runs of the carriers, and means on said belt adapted to engage the carriers and cause the belt and carriers to travel at uniform speed.

23. In mechanism for the purpose specified, a traveling carrier, a rod hingedly mounted on the carrier, a trough section mounted on said rod and means whereby said rod is turned at the proper time during the travel of the carrier to tilt said section on the carrier and cause said trough section to discharge the material lying thereon.

24. In mechanism for the purpose specified, a rod rotatably mounted on a carrier, a cutter connected with said rod, a lever connected with said rod, and a cam fixed beside the carrier engaging said rod and causing the cutter to operate as it travels with the carrier.

25. In mechanism for the purpose specified, rods rotatably mounted on a carrier, a cutter connected with each rod, a lever connected with the end of said rod, a cam fixed beside the carrier engaging said rod to cause the cutter to operate as it travels with the carrier, a spring for normally retracting the cutter and for holding the rod in one position, and a lever and a cam for shifting the cutter carrying the rod endwise after the cutting operation to cause the cutter to clear the severed material.

26. In a machine for the purpose specified, the combination of a pair of endless carriers arranged side by side and each composed of a series of pivotally connected links, the inner runs of said carriers being parallel but spaced apart; a series of equi-distant trough sections mounted on links of said carriers; opposed trough members on adjacent runs of the carriers carrying the tile or material being operated upon; a series of spaced cutting devices mounted on links of each carrier and adapted to operate upon the material supported by the trough section members during the travel thereof down the center line of the machine; guide wheels adjacent each end of the machine, around which the carriers are passed, and guides for supporting the trough sections and cutting devices as they travel down the center of the machine.

27. In mechanism as set forth in claim 26, stationary cams adjacent the inner runs of the carriers, and means connected with the cutters and engaging the carriers whereby the cutters are caused to operate upon the material and sever the same into desired lengths as it is moved along the center of the machine.

28. In a machine as set forth in claim 26, cams beside the inner runs of the carriers, and devices connected with the trough sections and engaging the cams whereby the severed sections of the material are up-ended, substantially as described.

29. In a machine as set forth in claim 26, an endless belt underlying the inner runs on the carriers, and means on said belt adapted to engage the carriers and cause the belt and carriers to travel at uniform speed.

30. In mechanism as set forth in claim 26, cams adjacent the inner runs of the carrier; means connected with the cutters and engaging the cams whereby the cutters are caused to operate upon the material and sever the same as it is moved along the center of the machine; other cams adjacent the inner runs of the carriers; and devices connected with the trough sections and engaging the latter cams whereby the severed sections of the material are up-ended.

31. In mechanism as set forth in claim 26, rods hingedly mounted on the carrier links; a trough section mounted on each rod, and cams and coacting means whereby said rod is turned at the proper time during the travel of the carrier to cause the trough section to discharge the material lying thereon.

32. In mechanism as set forth in claim 26, rods rotatably mounted on the carrier links, a cutter connected with each rod, a lever connected with each rod, and a cam fixed beside the carrier adapted to be engaged by said rod and cause the cutter to operate as it travels with the carrier.

33. In mechanism as set forth in claim 26, rods rotatably mounted on the carrier links; a cutter connected with each rod, a lever connected with the end of each rod, a cam fixed beside the carrier engaging said lever to cause the cutter to operate as it travels with the carrier; a spring for normally retracting the cutter and for holding the rod in one position; and a lever and a cam for pushing the rod endwise after the cutting operation to cause the cutter to clear the severed material.

34. In a machine for the purpose specified, the combination of a pair of endless carriers arranged side by side in the same plane and each composed of a series of pivotally connected links; the inner runs of said carriers being parallel but spaced apart; and a series of spaced cutting devices mounted on links of each carrier and adapted to operate upon the material during the travel thereof down the center line of the machine.

35. In mechanism as set forth in claim 34 stationary cams adjacent the inner runs of the carriers, and means connected with the cutters and engaging the carriers whereby the cutters are caused to operate upon the material and sever the same into desired lengths as it is moved along the center of the machine.

36. In a machine as set forth in claim 34, an endless belt underlying the inner runs on the carriers, and means on said belt adapted to engage the carriers and cause the belt and carriers to travel at uniform speed.

37. In apparatus as set forth in claim 1, a rod mounted on the carrier, a bottom trough section attached to this rod, a side trough section hinged to the bottom trough section, and means for adjusting the side section relative to the bottom section, substantially as described.

38. In apparatus as set forth in claim 10, a rod mounted on the carrier, a bottom trough section attached to this rod, a side trough section hinged to the bottom trough section, and means for adjusting the side section relative to the bottom section, substantially as described.

39. In apparatus as set forth in claim 26, a rod mounted on the carrier, a bottom trough section attached to this rod, a side trough section hinged to the bottom trough section, and means for adjusting the side section relative to the bottom section, substantially as described.

40. In apparatus as set forth in claim 1, a rod mounted on the carrier, a bottom trough section attached to this rod, a side trough section hinged to the bottom trough section, means for adjusting the side section relative to the bottom section, and means whereby the rod and section are tilted upward to discharge the material thereon during the travel of the carrier.

41. In mechanism as set forth in claim 10, a rod mounted on the carrier, a bottom trough section attached to this rod, a side trough section hinged to the bottom trough section, means for adjusting the side section relative to the bottom section, and means whereby the rod and section are tilted upward to discharge the material thereon during the travel of the carrier.

42. In mechanism as set forth in claim 26, a rod mounted on the carrier, a bottom trough section attached to this rod, a side trough section hinged to the bottom trough section, means for adjusting the side section relative to the bottom section, and means whereby the rod and section are tilted upward to discharge the material thereon during the travel of the carrier.

43. In mechanism for the purpose specified, a carrier, a rod mounted on the carrier, a bottom trough section attached to this rod, a side trough section hinged to the bottom trough section and means connected with the rod for adjusting the side section relative to the bottom section, substantially as described.

In testimony that I claim the foregoing as my own, I affix my signature.

NOEL C. WHITNEY.